Nov. 4, 1924. 1,514,314
H. A. DOUGLAS
CIRCUIT CONTINUING DEVICE
Filed April 4, 1921
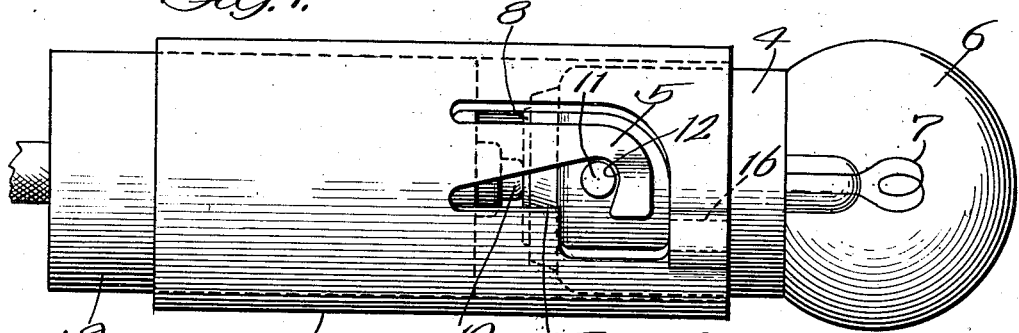
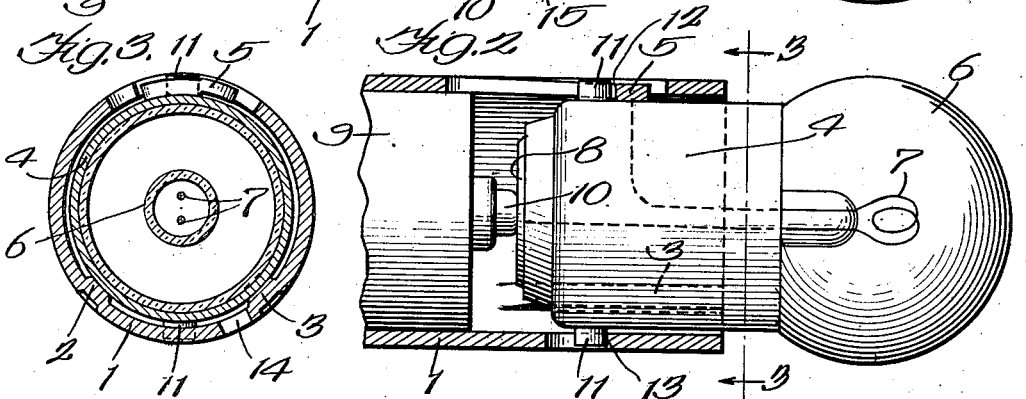
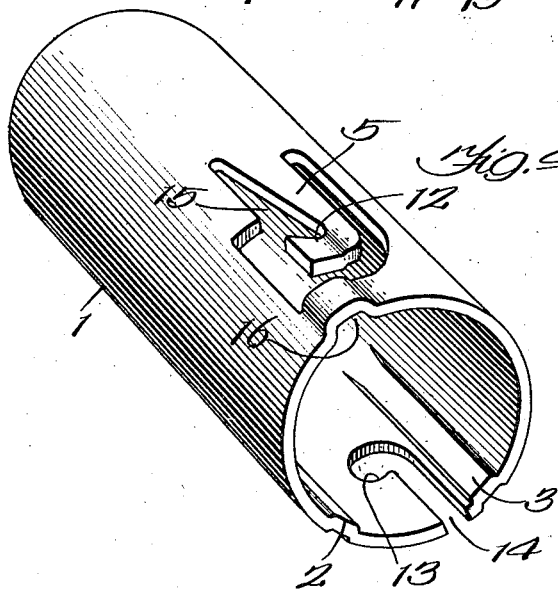
Inventor:
Harry A. Douglas.

Patented Nov. 4, 1924.

1,514,314

UNITED STATES PATENT OFFICE.

HARRY A. DOUGLAS, OF BRONSON, MICHIGAN.

CIRCUIT-CONTINUING DEVICE.

Application filed April 4, 1921. Serial No. 458,557.

*To all whom it may concern:*

Be it known that I, HARRY A. DOUGLAS, citizen of the United States, residing at Bronson, in the county of Branch and State of Michigan, have invented a certain new and useful Improvement in Circuit-Continuing Devices, of which the following is a full, clear, concise, and exact description.

My invention relates to circuit continuing devices which employ contact carrying shells and contact carriers separably assembled with said shells, the contacts upon the shells and carriers being in circuit continuing engagement when the shells and carriers are coupled. My invention has for its object the provision of an improved construction whereby the contact carrying shell and the contact carrier separably coupled therewith are held in substantially rigid relation with their axes preferably coincident. My invention is of particular utility when embraced in a reflecting lamp, as thereby the incandescent filament may be placed and held in proper focus, the lamp base constituting one form of contact carrier in the structure of my invention.

In carrying out my invention I employ three engaging parts within the bore of the shell, these parts being desirably all carried permanently by the shell. Two of these parts are preferably in the form of rigid parallel ribs extending along and integrally formed with the shell and parallel with its axis, these ribs being preferably ninety degrees apart. The third engaging part is preferably in the form of a spring tongue also formed integrally with the shell and with its free end opposing the space between the ribs and engageable with the contact carrier at a place between the ends of the ribs and the ends of the contact carrier engaging said ribs. The spring tongue thus holds the contact carrier and shell concentric and, by engaging an intermediate portion of the shell, prevents the contact carrier from inclining with respect to the shell. If the shell and carrier are coupled by means of bayonet projections, a bayonet projection engaging seat may be formed in the free end of the spring tongue.

I will explain my invention more fully by reference to the accompanying drawing showing the preferred embodiment thereof and in which Fig. 1 is a view in side elevation illustrating a contact carrying shell and an incandescent lamp assembled therewith; Fig. 2 shows a part of the shell of Fig. 1 in section and the lamp in elevation, the shell and lamp being at right angles to the position shown in Fig. 1; Fig. 3 is a sectional view on line 3—3 of Fig. 2; and Fig. 4 is a perspective view of the shell.

Like parts are indicated by similar characters of reference throughout the different figures.

The cylindrical metallic shell 1 is formed with two laterally spaced apart ribs or projections 2 and 3 that project into the bore of the shell to an extent which corresponds with the clearance or spacing normally intervening between the shell and contact carrier 4, these ribs being desirably straight and parallel with the axis of the shell and ninety degrees apart, though the invention is not to be thus limited. The shell is also formed with a spring tongue 5 whose free end is opposite the space between the ribs and one hundred thirty five degrees from either rib. This tongue is so constrained that when its free end is not in engagement with the contact carrier 4 it will project inwardly beyond the position of the contact which may thus be held firmly in engagement with the shell.

As illustrated, the cylindrical contact carrier 4 is the base of an incandescent lamp 6 whose filament 7 has one terminal connected with a metallic sheath which surrounds the lamp base and engages the shell 1 and its other terminal connected with the central contact 8 on the lamp base. The drawing illustrates a contact carrier 9 fixed within the shell, there being a forwardly spring pressed contact 10 upon this carrier that engages the contact 8 upon the lamp base.

Bayonet projections 11 extend laterally from the lamp base and are receivable within oppositely disposed seats 12 and 13 formed in the shell, channels 14 and 15 leading to these seats. The bayonet seat 12 is preferably formed in the free end of spring tongue 5. In order that the shell may not be weakened owing to the formation of the spring therefrom, the channel 15 has its outer end 16 formed by outwardly bulging the outer end of the shell at 16 instead of totally removing the metal at this point.

The free end of the spring 5 engages an intermediate portion of the lamp base and is equidistant from the ribs 2 and 3 so that the lamp base or other contact carrier is both centrally positioned within the shell and held from being tilted. The filament 7 may thus be maintained exactly at the focus of the parabolic reflector of a reflecting lamp.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

The combination with a cylindrical shell carrying a contact within its bore and formed at its outer end with a bayonet channel; of a cylindrical contact carrier having a bayonet projection receivable in said channel and engageable with a bayonet seat formed in said channel to engage the contacts carried by said shell and carrier; two laterally spaced apart projections carried by the shell and projecting within the bore thereof to engage said carrier; and a spring tongue also carried by the shell and having its free end opposite the space between said projections, this tongue end also projecting into the bore of the shell to engage the carrier, said bayonet seat being in the free end of said tongue which margins said channel.

In witness whereof, I hereunto subscribe my name this 30th day of March, A. D., 1921.

HARRY A. DOUGLAS.